United States Patent
Weindorf

(10) Patent No.: US 10,942,379 B2
(45) Date of Patent: Mar. 9, 2021

(54) SYSTEM AND METHOD FOR A MIRROR WITH ACTIVE FEEDBACK DIMMING

(71) Applicant: Visteon Global Technologies, Inc., Van Buren Township, MI (US)

(72) Inventor: Paul F. Weindorf, Novi, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 288 days.

(21) Appl. No.: 16/030,952

(22) Filed: Jul. 10, 2018

(65) Prior Publication Data

US 2020/0018997 A1 Jan. 16, 2020

(51) Int. Cl.
| | |
|---|---|
| G02F 1/133 | (2006.01) |
| G02F 1/01 | (2006.01) |
| G02F 1/137 | (2006.01) |
| B60R 1/12 | (2006.01) |

(52) U.S. Cl.
CPC .............. *G02F 1/0136* (2013.01); *B60R 1/12* (2013.01); *G02F 1/0121* (2013.01); *G02F 1/137* (2013.01); *B60R 2001/1253* (2013.01); *G02F 2203/02* (2013.01); *G02F 2203/07* (2013.01)

(58) Field of Classification Search
CPC ...... G02F 1/0136; G02F 1/137; G02F 1/0121; G02F 2203/02; G02F 2203/07; G02F 2203/48; G02F 2201/44; G02F 2201/58
See application file for complete search history.

(56) References Cited

U.S. PATENT DOCUMENTS

2004/0100598 A1* 5/2004 Adachi ............ G02F 1/133536
349/113

* cited by examiner

*Primary Examiner* — Joseph P Martinez
(74) *Attorney, Agent, or Firm* — Quinn IP Law

(57) ABSTRACT

A bi-modal dimming mirror includes a display and a switchable mirror configured to vary in transmissivity in response to a dimming control signal, which includes one or more of an LCD voltage, a rotator control signal, and/or a polarizer control signal. The bi-modal dimming mirror includes a visible segment overlying the display panel and a sample segment for calibrating the transmissivity or the reflectivity of the switchable mirror. A light source projects a light beam through the sample segment, which is measured by a light sensor. A liquid crystal cell changes polarization of light passing therethrough in response to application of an LCD voltage. In some embodiments, an active absorptive polarizer varies in absorption of polarized light in response to a polarizer control signal. An active polarization rotator varies rotation of polarized light in response to a rotator control signal.

20 Claims, 16 Drawing Sheets

SYSTEM AND METHOD FOR A MIRROR WITH ACTIVE FEEDBACK DIMMING

BACKGROUND

The use of rear view electronic display mirrors is becoming more prevalent because a more inclusive image can be presented to the driver. Rear view electronic display monitors are commonly used to present an image from a rear view camera when driving in reverse. Such rear view electronic displays may also help to reduce blind spots that can limit a driver's field of view. So called blind spots have increased in recent years due to a combination of vehicle styling and larger structural components, such as pillars, that provide increased protection in case of a rollover and which accommodate safety features such as curtain-style airbags.

Conventional dimmable mirrors commonly employ electrochromic elements to provide a dimming function, which is used, for example, to reduce reflected glare from headlights of following vehicles. Conventional dimmable mirrors that include electrochromic elements are not efficient at transmitting a display image from behind the mirror element.

SUMMARY

A bi-modal dimming mirror may include a display panel generating an image, with a switchable mirror overlying the display panel and configured to vary in transmissivity in response to a dimming control signal. The switchable mirror includes a visible segment overlying a portion of the display panel for presenting a graphical image to a viewer. The switchable mirror can also include a sample segment independent of the visible segment and configured to calibrate the transmissivity or the reflectivity of the switchable mirror.

The bi-modal dimming mirror may also include a light source projecting a light beam through the sample segment of the switchable mirror. A light sensor overlies the sample segment opposite the display panel for measuring a reflection rate of the sample segment by measuring an intensity of the light beam.

A method of controlling a bi-modal dimming mirror is provided. The method can include the steps of: measuring an output luminance corresponding to a maximum transmission of an active polarization rotator; applying a first drive voltage to the active polarization rotator; measuring the output luminance with an active absorptive polarizer in a maximum absorptive state and with the active polarization rotator at the first drive voltage to determine a reflection rate of the active polarization rotator; measuring a maximum transmission of the active absorptive polarizer; applying a second drive voltage to the active absorptive polarizer; and measuring the output luminance with the active polarization rotator in the rotating condition and with the active absorptive polarizer at the second drive voltage to determine a reflection rate of the active absorptive polarizer. Either or both of the first drive voltage and/or the second drive voltage may be a pulse-width modulation (PWM) signal. Either or both of the first drive voltage and/or the second drive voltage may be generated as the output of a Proportional-Integral-Derivative (PID) control loop, which may be a velocity form PID loop utilizing only an integration function.

A method of controlling a bi-modal dimming mirror can include the steps of: measuring an output luminance corresponding to a maximum reflection of an active polarization rotator; applying a first drive voltage to the active polarization rotator; measuring the output luminance with an active absorptive polarizer in a maximum absorbing state, and with the active polarization rotator at the first drive voltage to determine a reflection rate of the active polarization rotator; measuring a maximum transmission of the active absorptive polarizer by controlling the active absorptive polarizer to a minimal absorbing state and controlling the active polarization rotator to a non-rotating condition; applying a second drive voltage to the active absorptive polarizer; and measuring the output luminance with the active polarization rotator in the non-rotating condition and with the active absorptive polarizer at the second drive voltage to determine a reflection rate of the active absorptive polarizer.

BRIEF DESCRIPTION OF THE DRAWINGS

Further details, features and advantages of designs of the invention result from the following description of embodiment examples in reference to the associated drawings.

DETAILED DESCRIPTION

Figure 1:
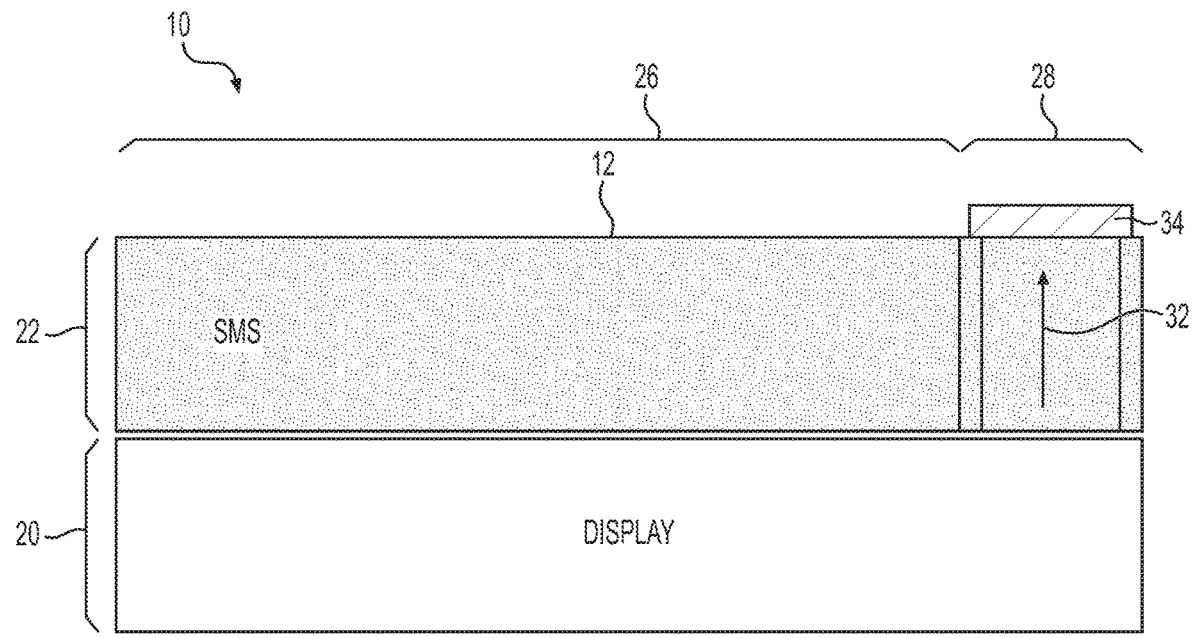
FIG. 1 is a schematic cross-sectional view of a bi-modal mirror in accordance with an embodiment of the present disclosure.

Recurring features are marked with identical reference numerals in the figures, in which a bi-modal dimming mirror 10 is disclosed. A bi-modal mirror is a device that can switch between a reflective mirror mode and a non-reflective display mode. Such bi-modal mirrors may include a "lens assembly" component which serves as a mirror and as a shutter to switch from a mirror mode to a display mode.

The bi-modal dimming mirror 10 may include a display panel 20 generating an image. The image may include any still or dynamic data such as, for example, views from one or more cameras, navigation maps and/or directions, or graphical elements such as numeric data displays. The display panel 20 may be any type of device capable of generating an image such as, for example, a thin film transistor (TFT) device or an organic light-emitting diode (OLED) device. The display panel 20 may be illuminated by an external backlight or may produce light from internally such as by an OLED. An external backlight may include one or more light sources such as, for example LEDs or cold cathode fluorescent lamps (CCFLs), and which may be mounted behind and/or along one or more edges of the display panel 20. The display panel 20 may alternatively be non-illuminated and dependent upon external light entering through a viewing surface 12.

The bi-modal dimming mirror 10 can also include a switchable mirror 22 overlying the display panel 20 and configured to vary in transmissivity in response to a dimming control signal 24. The switchable mirror 22 may also be called a switchable mirror system (SMS). As detailed below in various sections related to different components in the various embodiments, the dimming control signal 24 includes one or more of: an LCD voltage $V_{LCD}$, a rotator control signal $V_{Rot}$, and/or a polarizer control signal $V_{Pol}$. The switchable mirror 22 includes a visible segment 26 overlying a portion of the display panel 20 for presenting a graphical image to a viewer. The visible segment 26 may overlie the entire display panel 20. The switchable mirror 22 can also include a sample segment 28 independent of the visible segment 26 and configured to calibrate the transmissivity or the reflectivity of the switchable mirror 22. In other words, the visible segment 26 and the sample segment 28 are separate from one another, although they may be adjoining and/or different physical areas of the same underlying structures.

Figure 2:
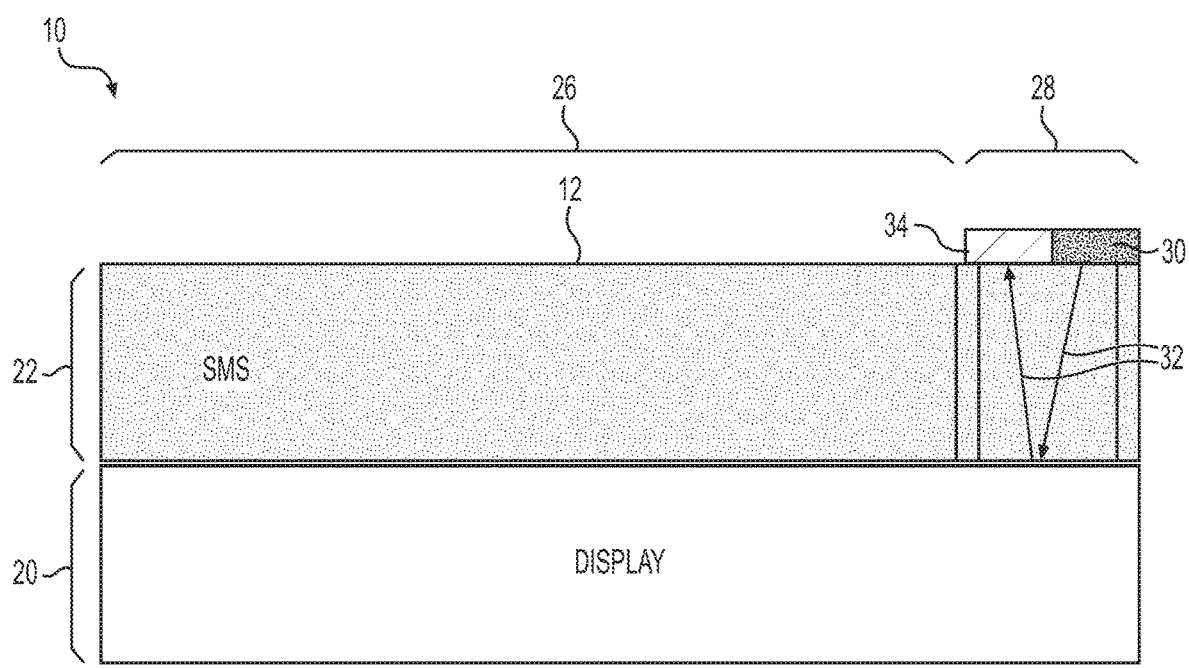
FIG. 2 is a schematic cross-sectional view of a bi-modal mirror in accordance with another embodiment of the present disclosure.

The bi-modal dimming mirror 10 can also include a light source 30 projecting a light beam 32 through the sample segment 28 of the switchable mirror 22. A light sensor 34 overlies the sample segment 28 opposite the display panel 20 for measuring a reflection rate of the sample segment 28 by measuring an intensity of the light beam 32. The light sensor 34 may be a linear type or a logarithmic type such as the OSRAM 5711. The light source 30 may be disposed on a side of the switchable mirror 22 opposite the light sensor 34 and may be integral with the display panel 20 as shown in FIG. 1. Alternately, the light source 30 may be disposed on the viewing surface 12 of the switchable mirror 22. In other words, the light source 30 may be disposed on the same side of the switchable mirror 22 as the light sensor 34 and measure the intensity of the light beam 32 as it passes two times through the switchable mirror 22 as shown in FIG. 2.

Figure 3:
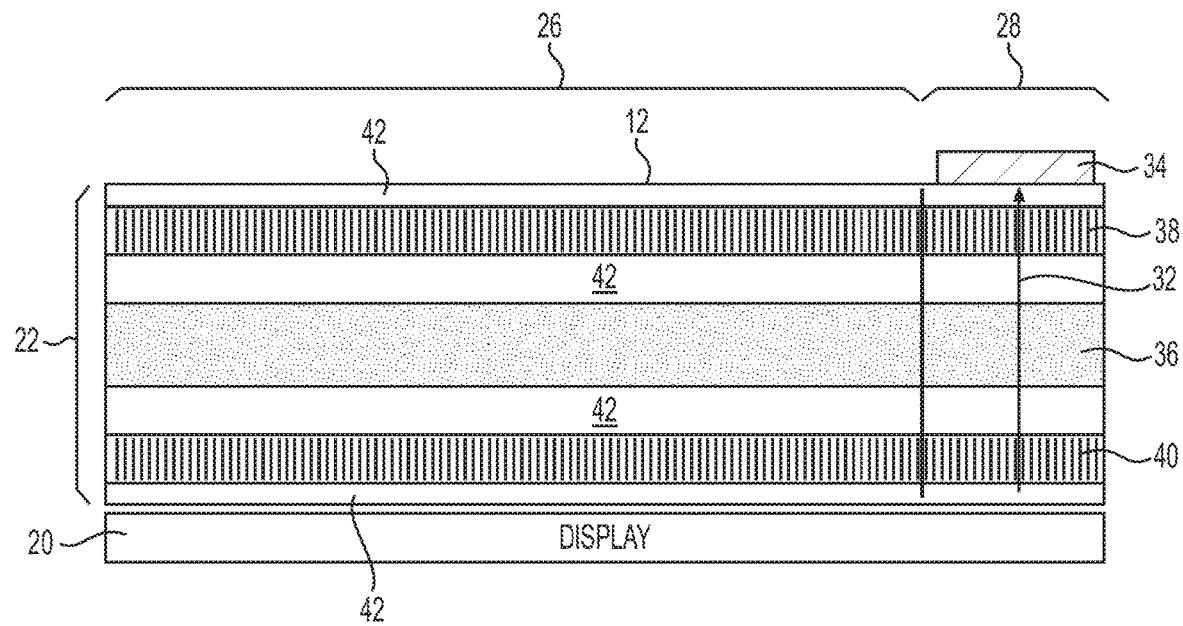
FIG. 3 is a schematic cross-sectional view of a bi-modal mirror in accordance with another embodiment of the present disclosure.
Figure 4:
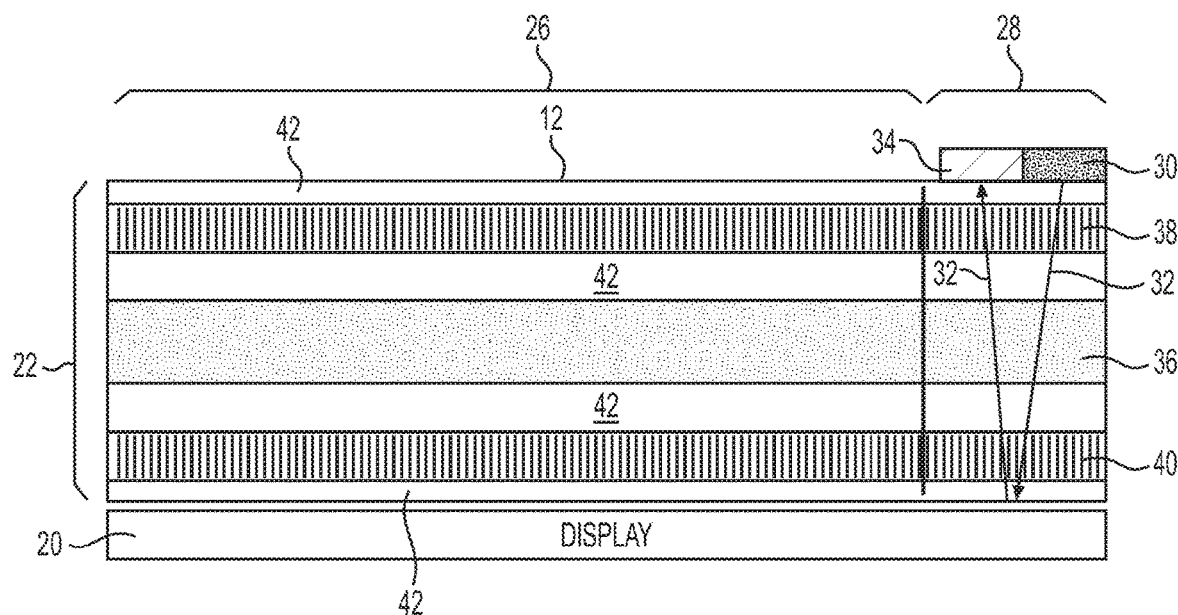
FIG. 4 is a schematic cross-sectional view of a bi-modal mirror in accordance with another embodiment of the present disclosure.

In the embodiments of FIGS. 3 and 4, the switchable mirror 22 includes a liquid crystal cell 36 changing polarization of light passing therethrough in response to application of an LCD voltage $V_{LCD}$. The liquid crystal cell 36 sandwiched between a linear absorptive polarizer 38 and a static reflective polarizer 40. The liquid crystal cell 36 is a Twisted Nematic (TN) type cell in the example embodiment provided, although other types of liquid crystals may be used. Additional transparent layers 42 of glass separate and supporting the components and function to contain the liquid crystal material within the liquid crystal cell 36. The transparent layers 42 may also include electrodes (not shown in the FIGS) for applying the LCD voltage $V_{LCD}$ to the liquid crystal cell 36. This change in polarization allows the liquid crystal cell 36 to vary the dimming of the image presented on the bi-modal dimming mirror 10.

Figure 9:
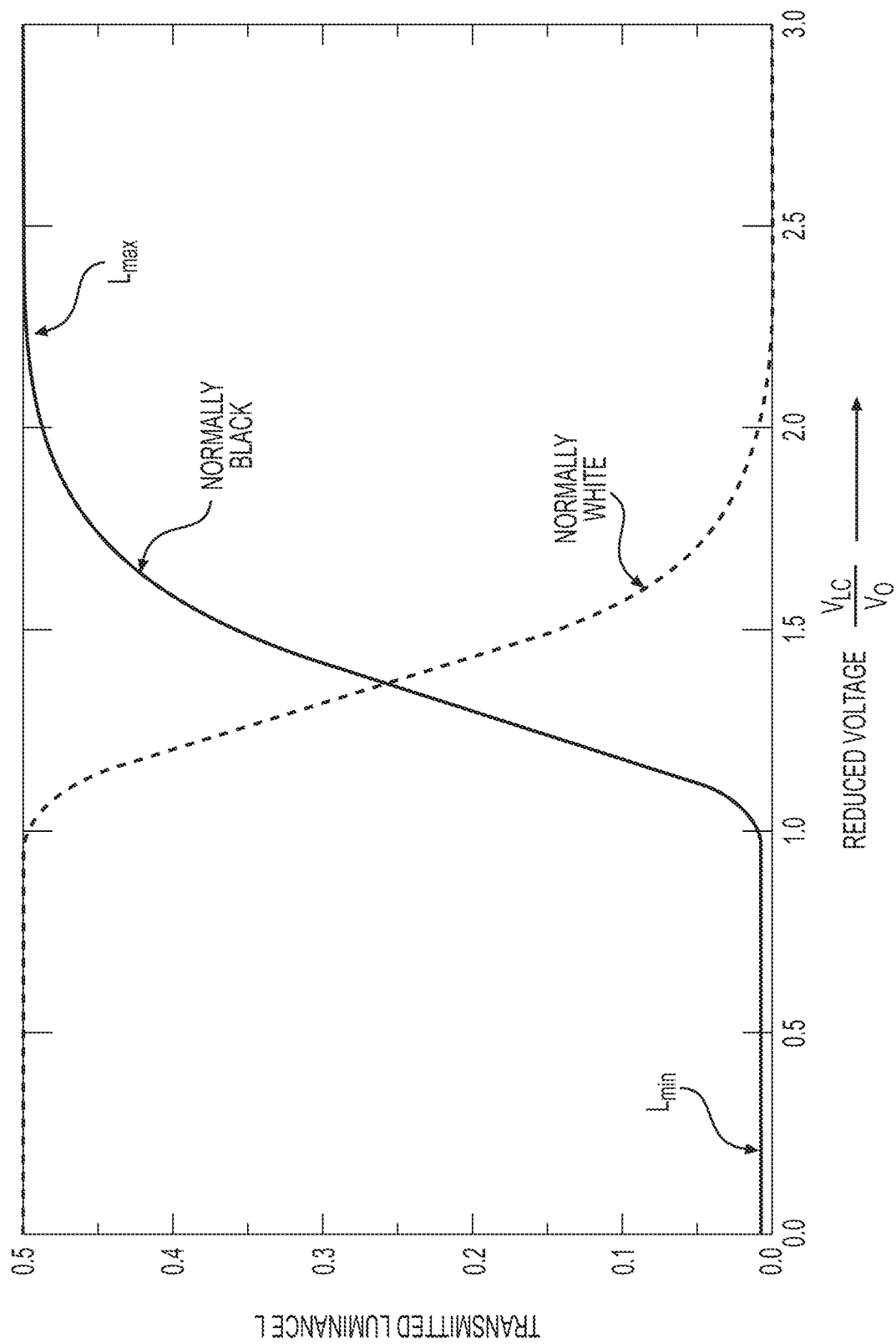
FIG. 9 is a graph of a transfer function of a TN LCD cell.

The liquid crystal cell 36 may therefore be used to perform a dimming function such as may be desired for night-time operation. Note that in a transmissive mode of operation, the display luminance can be controlled to adjust the dimming level and therefore an electrochromic (EC) cell is neither required nor desired. The transfer function of a TN or similar cell is fairly steep as shown in FIG. 9 and varies with temperature. Since the transmission curve varies significantly (left and right in FIG. 9) with temperature and cell to cell variation, a feedback control mechanism is required to maintain precise control for the reflectance rate.

The transmission and associated reflection rate of the switchable mirror 22 may be measured and precisely controlled utilizing a feedback control system. The reflection rate, R, is directly proportional to the transmission rate, T, according to Equation (1), below where K is proportionality constant and $T_{Max}$ is the maximum transmission rate of the switchable mirror system when the LC cell 36 is driven "on".

$$R = K_1(T_{Max} - T) \tag{1}$$

The transmission for $T_{Max}$ may be formulated per Equation (2), below where $L_{In}$ is the luminance of the light source 30 (TFT pixels) behind the switchable mirror 22.

$$T_{Max} = \frac{L_{Max}}{L_{In}} \tag{2}$$

Similarly the actual operational transmission of the switchable mirror 22 may be written as Equation (3), below.

$$T = \frac{L}{L_{In}} \tag{3}$$

Substituting Equation (2) and (3) into Equation (1) yields Equation (4).

$$R = K_2(L_{max} - L) \tag{4}$$

Although measuring the reflection rate is certainly a possibility it is much easier to measure the transmission rate and determine the associated reflection rate per Equation (4). One method is to have a location on the front of the switchable mirror 22 where a light sensor may be located as shown in FIG. 1 or to put a specular reflector on the front, or viewing surface 12 of the switchable mirror 22 and have a light sensor 34 detector at a specular angle. When the dimming mirror 10 is in the reflective mode only the pixel(s) in front of the sample segment 28 and light sensor 34 need to be activated and can be hidden from the viewer. If zone backlighting (local dimming) is used, then only the zone associated with the sensor need be activated thereby reducing the light bleed from the display. Another possibility is to have a separate LED light source 30 outside of the TFT display area that is, outside of the display panel 20, so that the display panel 20 backlight may remain completely off in the reflective mode and eliminate any light bleed that may be objectionable under extreme dark nighttime conditions. This arrangement is shown in FIG. 2. By knowing the backlighting drive level and the associated value measured by the light sensor 34, the SMS transmission and associated reflection rate may be determined.

Figure 13:
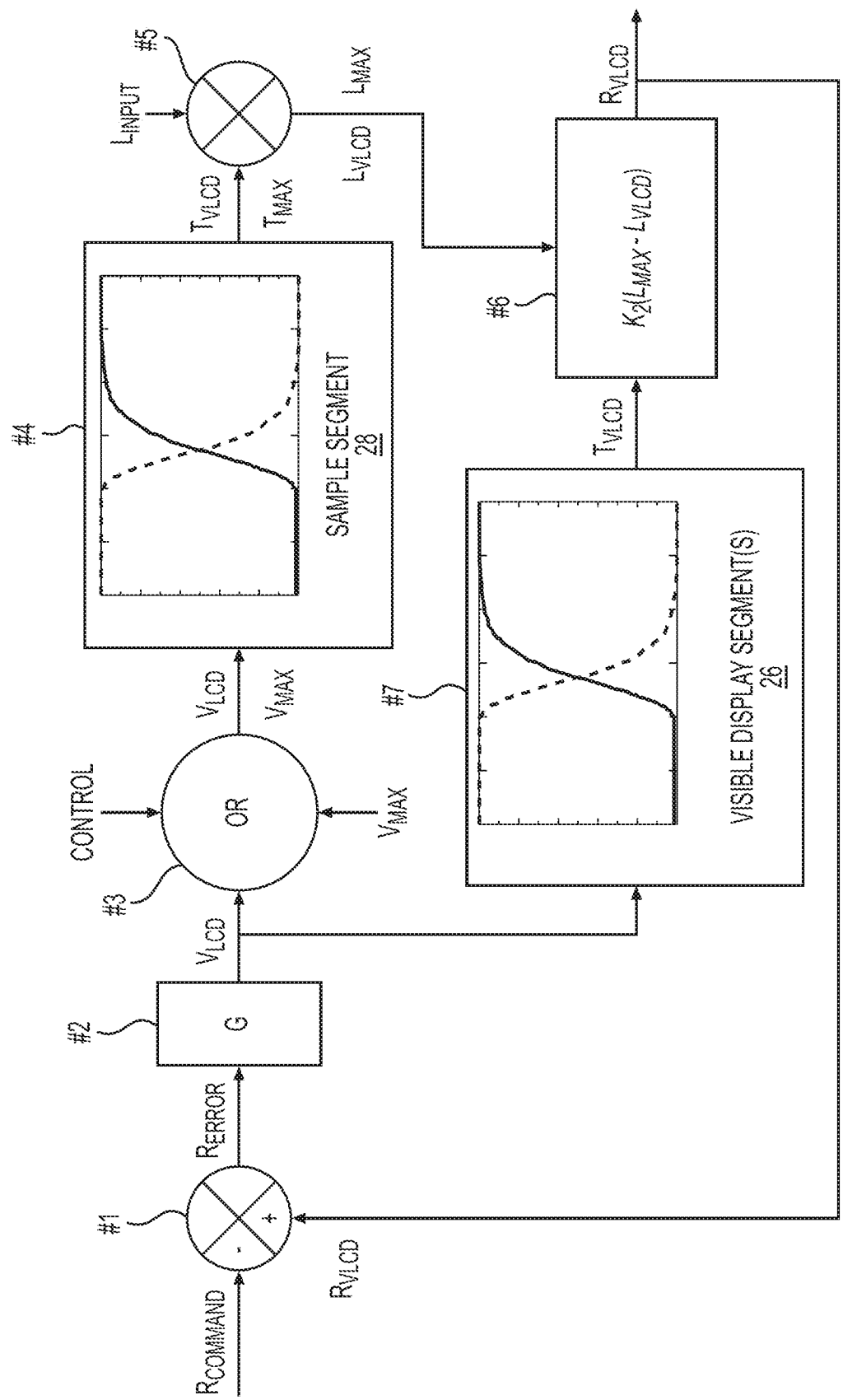
FIG. 13 is a control diagram of an example PID control loop.

The liquid crystal voltage, $V_{LCD}$, may then be adjusted to control the effective reflection rate using a feedback control method. The feedback control loop may be either digital (PID type) or analog or a combination or both as shown in FIG. 13. Note that per FIG. 9 for a normally black LC cell and Equation (1), the transmission to the light sensor increases with increasing liquid crystal voltage since the switchable mirror 22 has the reflective polarizer transmission axis aligned with the front absorptive polarizer. As shown in FIG. 13, the feedback control loop to accurately control the reflectance value starts with block #3. The function of block #3 is to either apply the $V_{LCD}$ voltage or the $V_{Max}$ voltage to the sample segment in an alternating fashion. Block #4 shows the normally black transfer function for a typical TN LC cell. Therefore when $V_{LCD}$ is applied to TN sample segment 28, the transmission from the TFT pixel(s) luminance, $L_{Input}$ behind the sample segment 28 becomes $T_{VLCD}$ which results in luminance $L_{VLCD}$ being measured by the light sensor in front of the sample segment. When the $V_{Max}$ voltage is applied to the sample segment 28, the transmission from the TFT pixel(s) luminance, $L_{Input}$, yields output luminance $L_{Max}$. Note that block #5 describes how the transmission factor of the LC cells 36 controls the amount of light from the TFT pixel(s) is transmitted through the cell and is essentially multiplicative in nature as shown in Equations (5) and (6), below.

$$L_{VLCD} = T_{VLCD} \times L_{Input} \qquad (5)$$

$$L_{Max} = T_{Max} \times L_{Input} \qquad (6)$$

Therefore by determining the luminance values from block #5, the actual SMS reflectance value may be determined per block #6 (reference Equation (4)). By comparing the feedback reflectance, $R_{VLCD}$, and comparing to the desired commanded reflectance, $R_{Command}$, the reflectance error $R_{Error}$, may be determined via block #1 by subtracting $R_{Command}$ from $R_{VLCD}$ in block #1. Therefore as an example if a lower reflectance is commanded the error term would increase thereby causing $L_{VLCD}$ to increase. This would cause the desired result of decreasing the reflectance per block #6. Note that the same $V_{LCD}$ is used to also drive the visible display segment(s) per block #7 thereby implementing the desired commanded reflectance, $R_{Command}$, on the areas of the display visible to the user.

Figure 14:
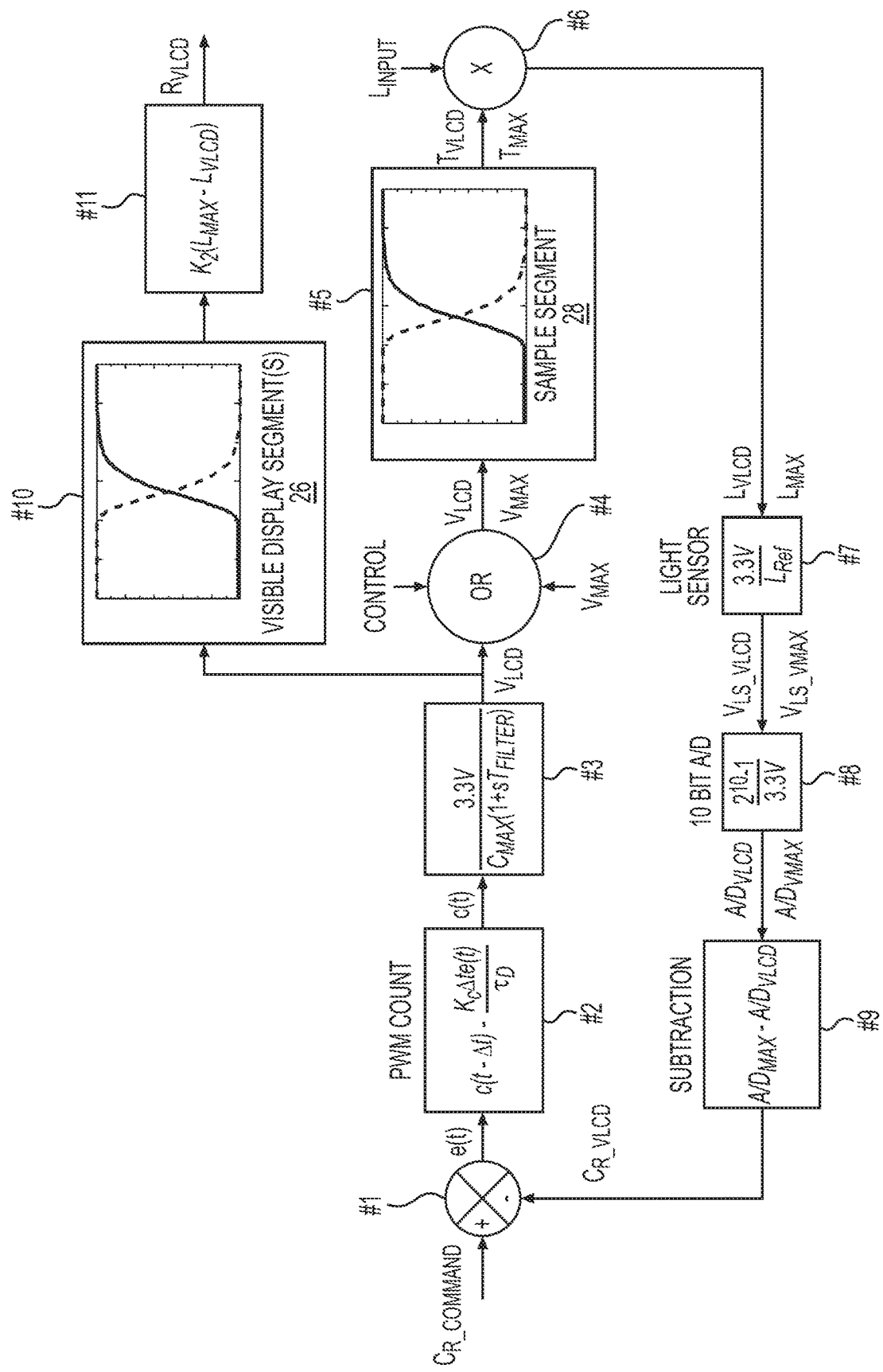
FIG. 14 is a control diagram of an example PID control loop.

The actual implementation may use a PID type feedback control system. A velocity form of the PID feedback loop that only utilizes the integration function is shown in FIG. 14. Note that the heart of the integration PID control loop is found in block #2 where a proportion of the error term is subtracted from the current control value. Therefore as an example, if the error term is positive this means that the feedback reflectance value from block #9 is lower than the commanded reflectance value. Therefore in order to increase the reflectance the current commanded PWM count value, c(t), must be decreased by the second term in block #2 until such time that the error is zero.

Although the previous example focused on using an orthogonal LC shutter, the same principles apply to an active absorptive polarizer liquid crystal cell.

In alternative embodiments shown in FIGS. 5-8, the visible segment 26 of the switchable mirror 22 includes an active absorptive polarizer 50 that varies in absorption of light polarized in an x-direction in response to a polarizer control signal $V_{Pol}$.

As shown in FIGS. 5-8, the visible segment 26 of the switchable mirror 22 includes a first static reflective polarizer 54 configured to reflect the light polarized in the x-direction and to transmit light polarized in a y-direction orthogonal to the x-direction. The x-direction and the y-direction are each orthogonal to a z-direction in which the light propagates. The first static reflective polarizer 54 may be a Reflective Polarizer Mirror (RPM) film, such as an RPM film by 3M, or a wire grid polarizer, such as the Wire-Grid Film by Asahi Kashei Corp.

Figure 5:
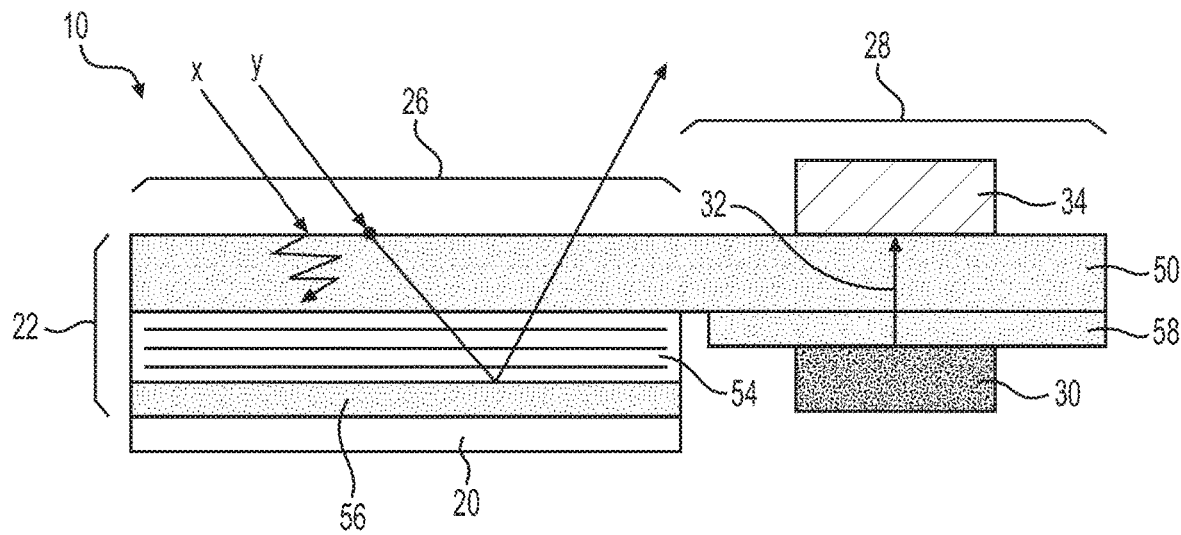
FIG. 5 is a schematic cross-sectional view of a bi-modal mirror in accordance with another embodiment of the present disclosure.
Figure 6:
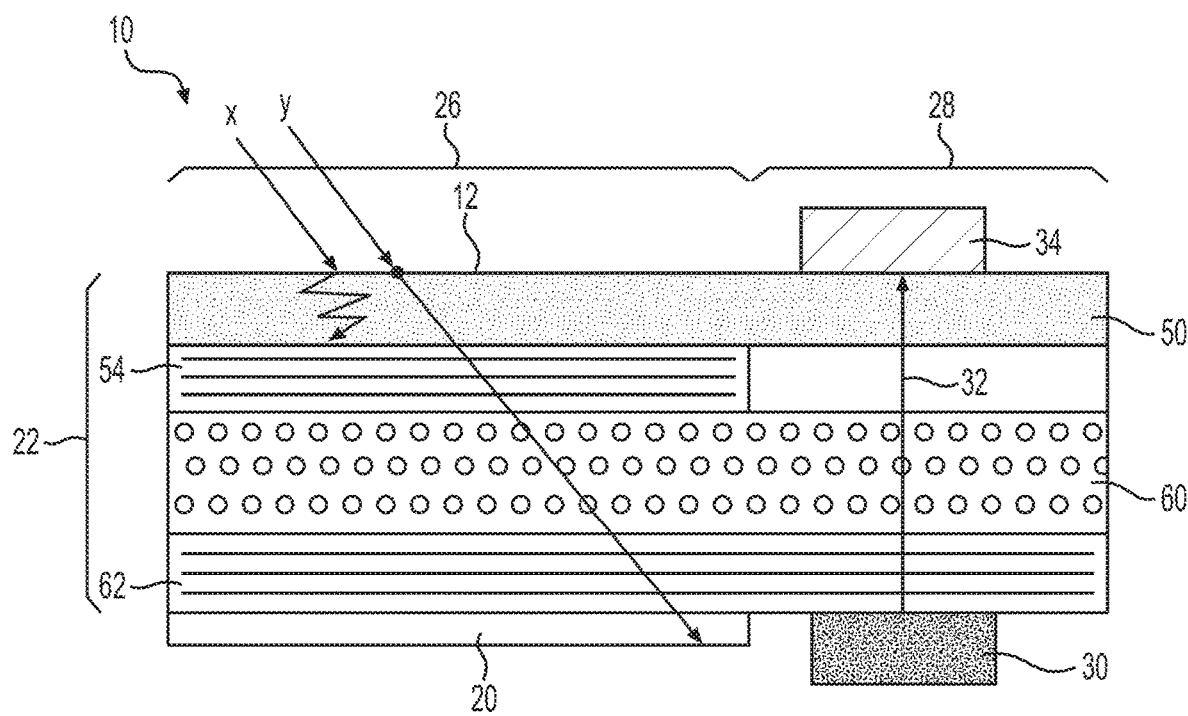
FIG. 6 is a schematic cross-sectional view of a bi-modal mirror in accordance with another embodiment of the present disclosure.

As shown in the embodiments of FIGS. 5 and 6, the sample segment 28 may not include a reflective polarizer. In other words, the first static reflective polarizer 54 may extend with the visible segment 26 but not within the sample segment 28. This is because the first static reflective polarizer 54 only transmits light oriented in the y orientation and the active absorptive polarizer 50 only attenuates light polarized in the x orientation.

Figure 7:
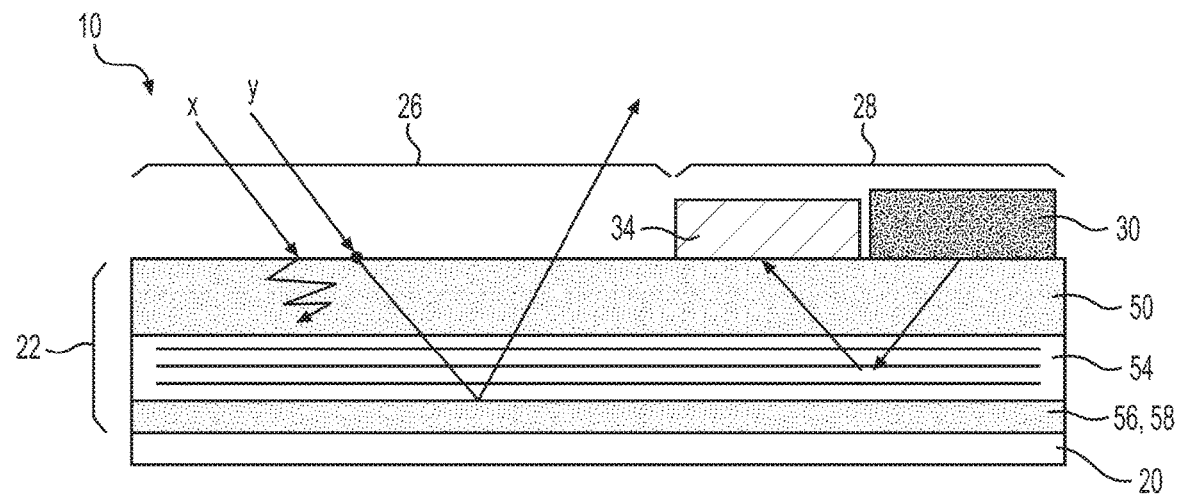
FIG. 7 is a schematic cross-sectional view of a bi-modal mirror in accordance with another embodiment of the present disclosure.

As shown in the embodiments of FIGS. 5 and 7, the visible segment 26 of the switchable mirror 22 includes a first semi-transparent mirror 56 disposed opposite the viewing surface 12. The first semi-transparent mirror 56 functions to raise the reflectance level as shown by the change from FIG. 10 to FIG. 11. Note that the reflectance dynamic range is still 0.5 on "top" of a static reflectance controlled by the first semi-transparent mirror 56. A semi-transparent mirror with 30% reflectance will provide a reflectance offset of 0.15 (15%) due to the operation of the first static reflective polarizer 54 which removes ½ of the light illuminating the first semi-transparent mirror 56. It is expected that semi-transparent mirror reflection rates from about 0.2 to 0.8 would be utilized in practice depending on the desired reflection rate and allowable TFT transmission losses.

As shown in the embodiment of FIG. 5, the sample segment 28 of the switchable mirror 22 includes a second semi-transparent mirror 58 independent from the first semi-transparent mirror 56, and which is directly adjacent the active absorptive polarizer 50.

Equation (4), discussed above applies to the embodiments of FIGS. 5-8, and only the value of the proportionality constant $K_2$ would be modified. Note that the second semi-transparent mirror 58 is optional in the sample segment 28 optical path and may be included only to increase the accuracy of the bi-modal dimming mirror 10 and to compensate for the transmission tolerance of the first semi-transparent mirror 56. Since the active absorptive polarizer 50 may not be a perfect device, some of the transmission from the display panel 20 may be reduced and could also be compensated for by using the measured transmission factor.

Figure 8:
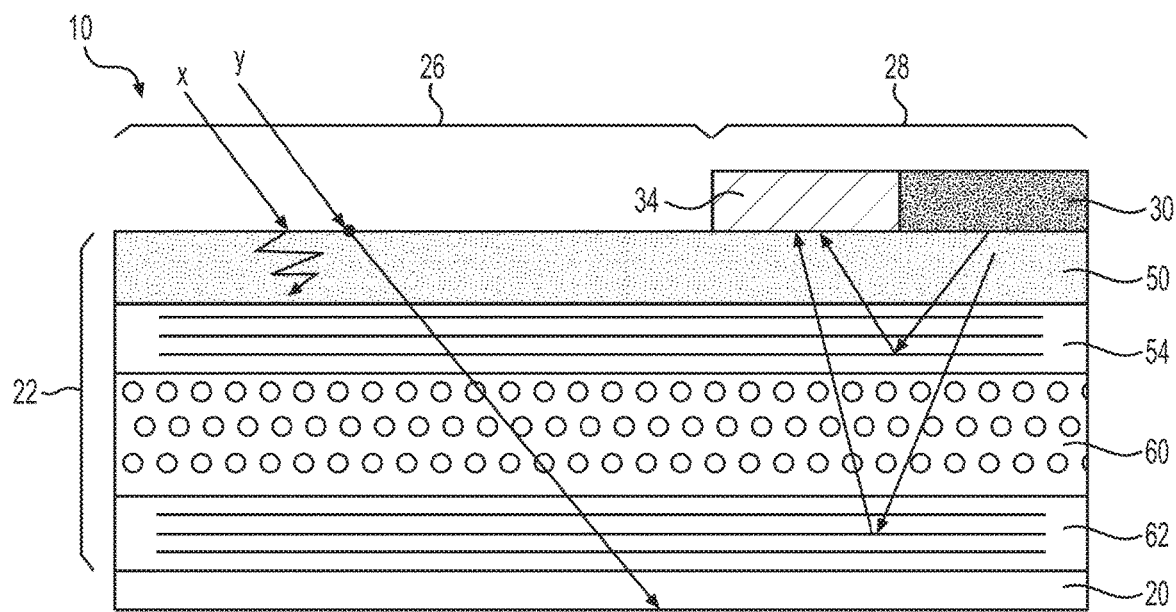
FIG. 8 is a schematic cross-sectional view of a bi-modal mirror in accordance with another embodiment of the present disclosure.

As shown in the embodiments of FIGS. 6 and 8, the bi-modal dimming mirror 10 further includes an active polarization rotator 60 adjacent the first static reflective polarizer 54 and opposite the viewing surface 12. The active polarization rotator 60 is configured to rotate the polarization angle by 90° in a non-energized state and to transmit light through without rotating the polarization in an energized state. The bi-modal dimming mirror 10 can also include a second static reflective polarizer 62 adjacent the active polarization rotator 60 and opposite the first static reflective polarizer 54 and configured to reflect the light polarized in the x-direction and to transmit light polarized in the y-direction. The second static reflective polarizer 62 may be the same or similar in construction to the first static reflective polarizer 54.

The same transmissive active feedback dimming technique may be utilized on active polarizer/rotator structure as shown in the embodiments of FIG. 6. It is important to note that in order to measure the transmission of the active absorptive polarizer 50, the first static reflective polarizer 54 must be removed from the sample segment 28. Since there are two elements to control, one method is to sequentially sample the elements separately and control the elements via two feedback control loops such as in FIG. 16. This control method is described in detail below.

Figure 10:
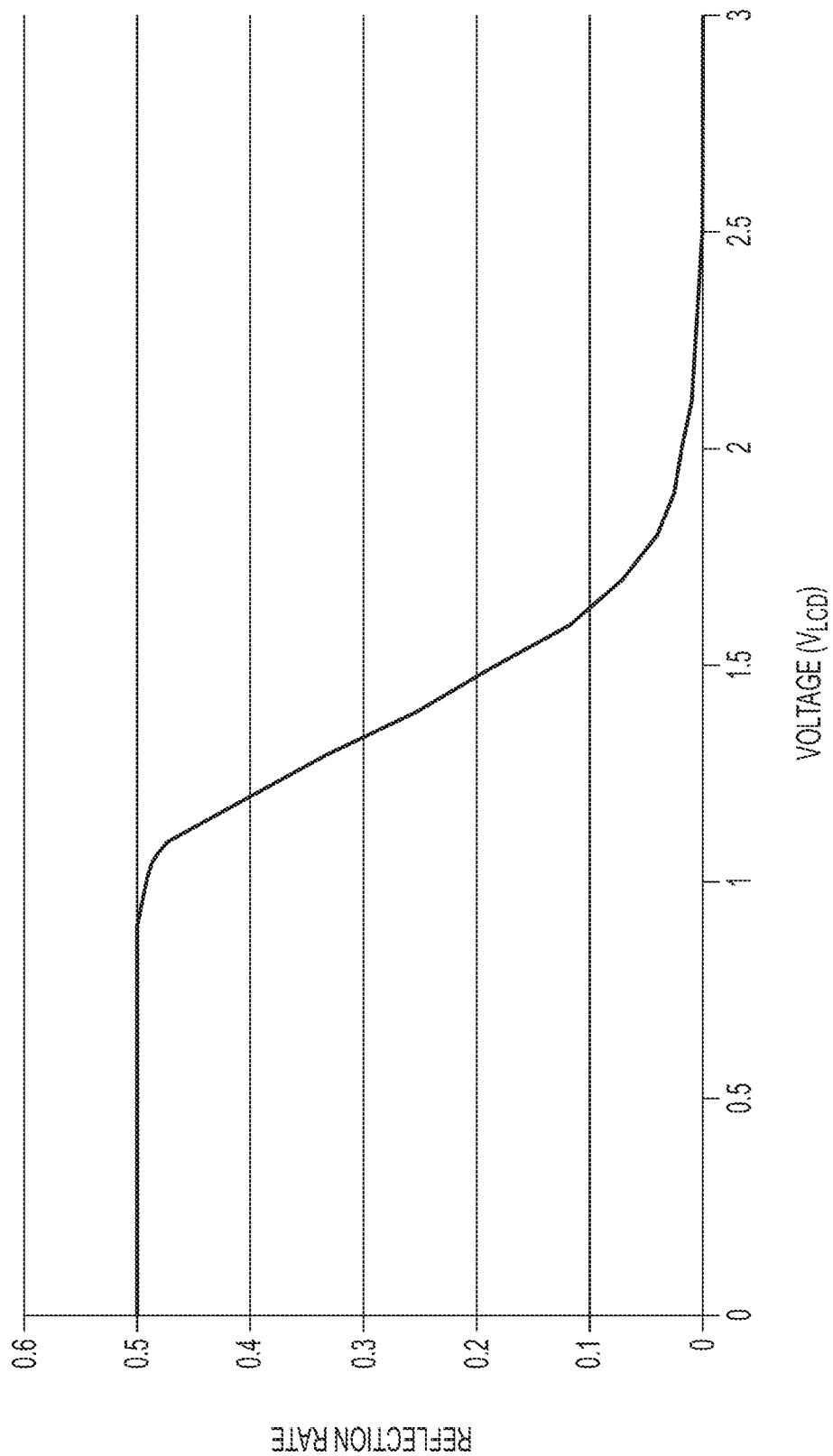
FIG. 10 is a graph of the Reflection Rate vs. Voltage for an active polarizer.

Another alternative is to use the liquid crystal cell 36 based bi-modal dimming mirror 10 with a rear reflective polarizer 40 to perform the dimming function such as may be desired for night time operation. Note that in the transmissive mode of operation the display luminance can be controlled to adjust the dimming level and therefore the electrochromic cell is neither required nor desired. Only the liquid crystal cell 36 is discussed in the following dissertation, although exactly the same principles apply to other structures capable of the dimming function since the reflection measurement and control method is a more direct method and applies to all other optical configurations capable of dimming. The reflection transfer function of a TN liquid crystal cell 36 with a reflective rear polarizer 40 or similar cell is fairly steep as shown in FIG. 10 and varies with temperature. Since the reflection rate varies significantly (left and right in FIG. 10) with temperature and cell to cell variation, a feedback control mechanism is required to maintain precise control for the reflectance rate.

The transmission and associated reflection rate of the switchable cell may be measured and precisely controlled utilizing a feedback control system. The reflection rate, R, is directly proportional to the transmission rate, T, according to Equation (7), below, where K is proportionality constant and $T_{Max}$ is the maximum transmission rate of the switchable mirror 22 when the LC cell 36 is driven "on".

$$R = K_1(T_{Max} - T) \tag{7}$$

The maximum reflection rate for $R_{Max}$ may be formulated per Equation (8), below, where $L_{In}$ is the luminance of the light source 30 shining into the front of the switchable mirror 22 and $L_{Max}$ is the reflected luminance measured by the light sensor 34.

$$R_{Max} = \frac{L_{Max}}{L_{In}} \tag{8}$$

Similarly the actual operational reflection rate of the switchable mirror 22 may be written as Equation (9), below, where L is the reflected luminance measured by the light sensor 34.

$$R = \frac{L}{L_{In}} \tag{9}$$

Combining Equations (8) and (9) yields Equation (10).

$$R = R_{Max} \frac{L}{L_{Max}} \tag{10}$$

One method to measure the reflected light is to have a location on the front of the mirror is shown in FIG. 2, where a light sensor 34 and light source 30 are attached to the front, or viewing surface 12 of the switchable mirror 22. The light sensor 34 may be a linear type or a logarithmic type such as the OSRAM 5711. The light source 30 may be an LED in the visible or non-visible range. In general the sample segment area will be hidden from the observer. By controlling the sample segment 28 and measuring both the maximum reflected light and the current control level reflected light, the switchable mirror 22 reflection rate may be determined.

Figure 15:
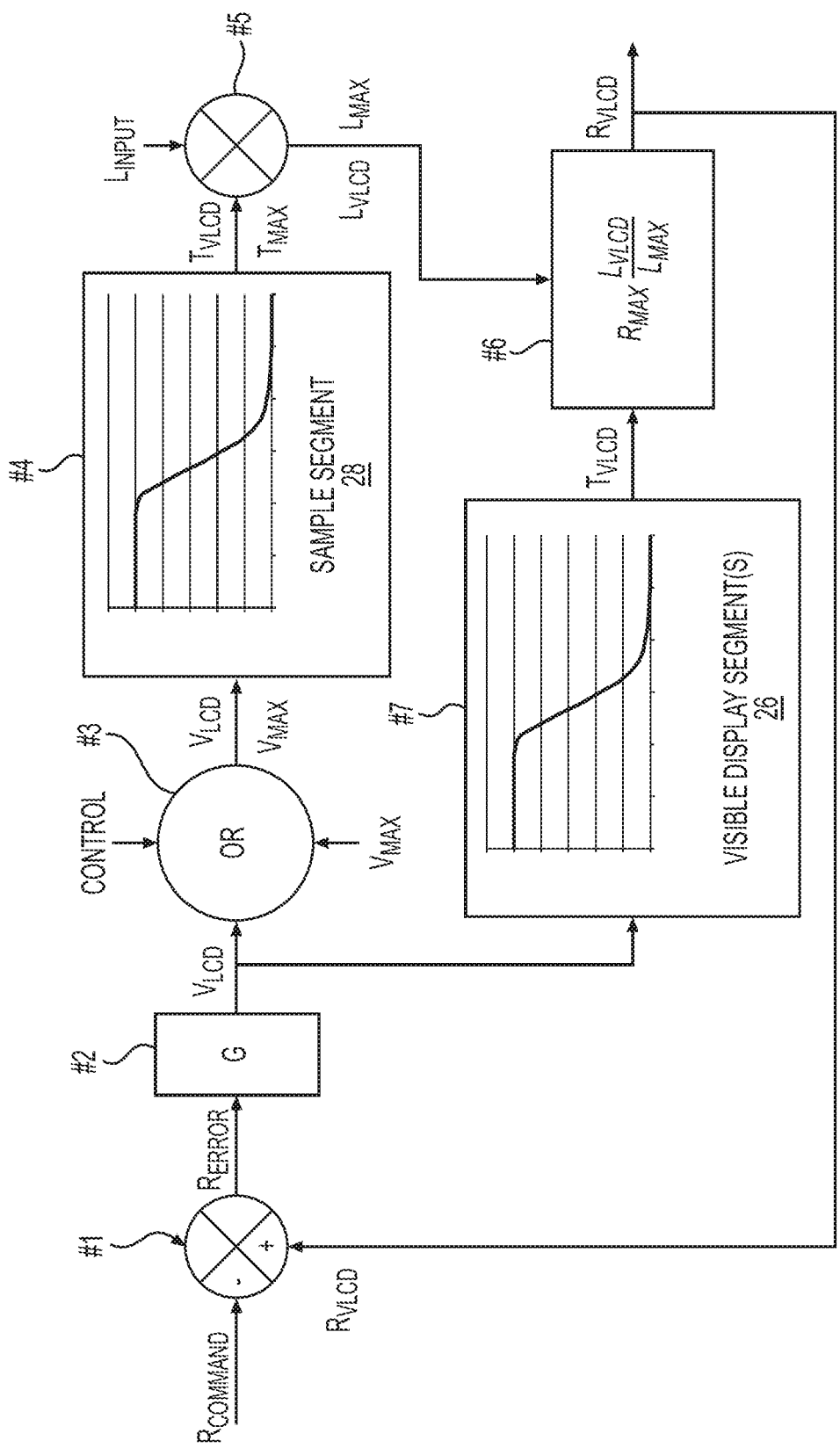
FIG. 15 is a control diagram of an example PID control loop.

The liquid crystal voltage, $V_{LCD}$, may then be adjusted to control the effective reflection rate using a feedback control method. The feedback control loop may be either digital (PID type) or analog or a combination or both as shown in FIG. 15. As shown in FIG. 15, the feedback control loop to accurately control the reflectance value starts with block #3. The function of block #3 is to either apply the $V_{LCD}$ voltage or the $V_{Max}$ voltage to the sample segment in an alternating fashion. block #4 shows the reflectance transfer function for a typical TN LC cell in conjunction with a reflective polarizer. Therefore when $V_{LCD}$ is applied to TN sample segment 28 at block #4, the reflection from the LED luminance, $L_{Input}$ in front of the sample segment 28 becomes $R_{VLCD}$ which results in luminance $L_{VLCD}$ being measured by the light sensor in front of the sample segment. When the $V_{Max}$ voltage is applied to the sample segment 28 at block #4, the reflection from the LED luminance, $L_{Input}$, yields output luminance $L_{Max}$. Note that block #5 describes how the reflection factor of the LC cells 36 controls the amount of light from the LED that is reflected from the LC cells 36 and is essentially multiplicative in nature as shown in Equations (11) and (12), below.

$$L_{VLCD} = R_{VLCD} \times L_{Input} \tag{11}$$

$$L_{Max} = R_{Max} \times L_{Input} \tag{12}$$

Therefore by determining the luminance values from block #5, the actual reflectance value of the switchable mirror 22 may be determined per block #6 (reference Equation (10)). By comparing the feedback reflectance, $R_{VLCD}$, and comparing to the desired commanded reflectance, $R_{Command}$, the reflectance error, $R_{Error}$, may be determined via block #1 by subtracting $R_{Command}$ from $R_{VLCD}$ in block #1. Therefore as an example if a lower reflectance is commanded the error term would increase thereby causing $L_{VLCD}$ to increase. This would cause the desired result of decreasing the reflectance per block #6. Note that the same $V_{LCD}$ is used to also drive the visible display segment(s) 26 per block #7 thereby implementing the desired commanded reflectance, $R_{Command}$, on the areas of the display panel 20 visible to the user.

Figure 16:
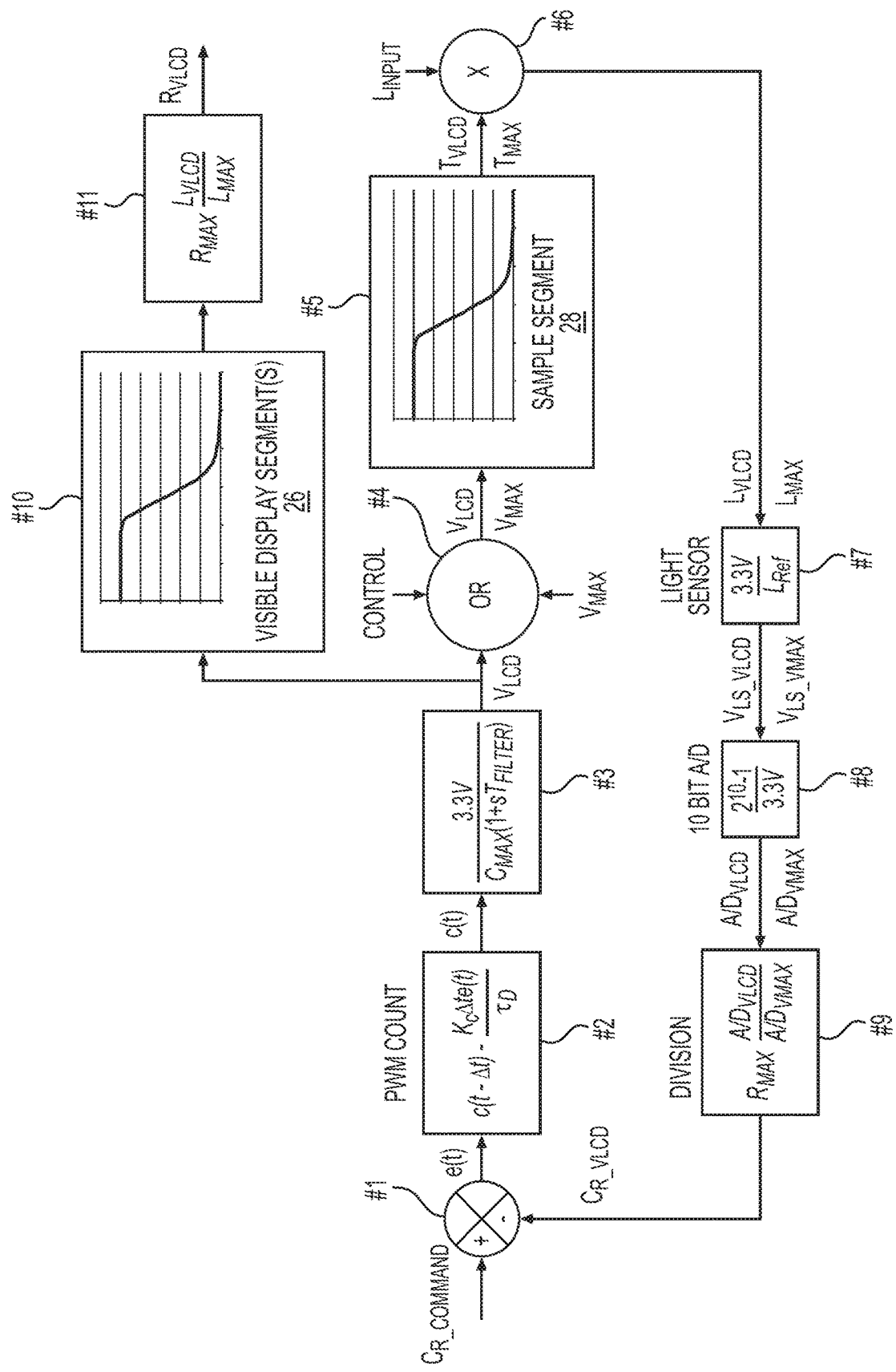
FIG. 16 is a control diagram of an example PID control loop.

The actual implementation may use a PID type feedback control system. A velocity form of the PID feedback loop that only utilizes the integration function is shown in FIG. 16. Note that the heart of the integration PID control loop is found in block #2 where a proportion of the error term is subtracted from the current control value. Therefore as an example, if the error term is positive this means that the feedback reflectance value from block #9 is lower than the commanded reflectance value. Therefore in order to increase the reflectance the current commanded PWM count value, c(t), must be decreased by the second term in block #2 until such time that the error is zero. Note that the $R_{Max}$ in block #9 may be in percentage or another factor so that the count values may be constructed in whole numbers for PID software implementation simplicity.

It should be noted that although more accurate, the sample segment 28 is not absolutely necessary. An alternative method is to sample $L_{Max}$ during power up and to use that value for the remainder of the operational cycle. If during the operational cycle $L_{Max}$ is commanded by the user or by the auto-dimming system, then of course that most recent $L_{Max}$ sample could be used by the PID loop for the remainder of the operational cycle.

Although the previous example focused on using an orthogonal LC shutter 36, the same principles apply to the embodiments including an active absorptive polarizer 50. For example, the same reflective active feedback dimming technique may be utilized with the active absorptive polarizer 50 as shown in FIG. 7.

Figure 11:
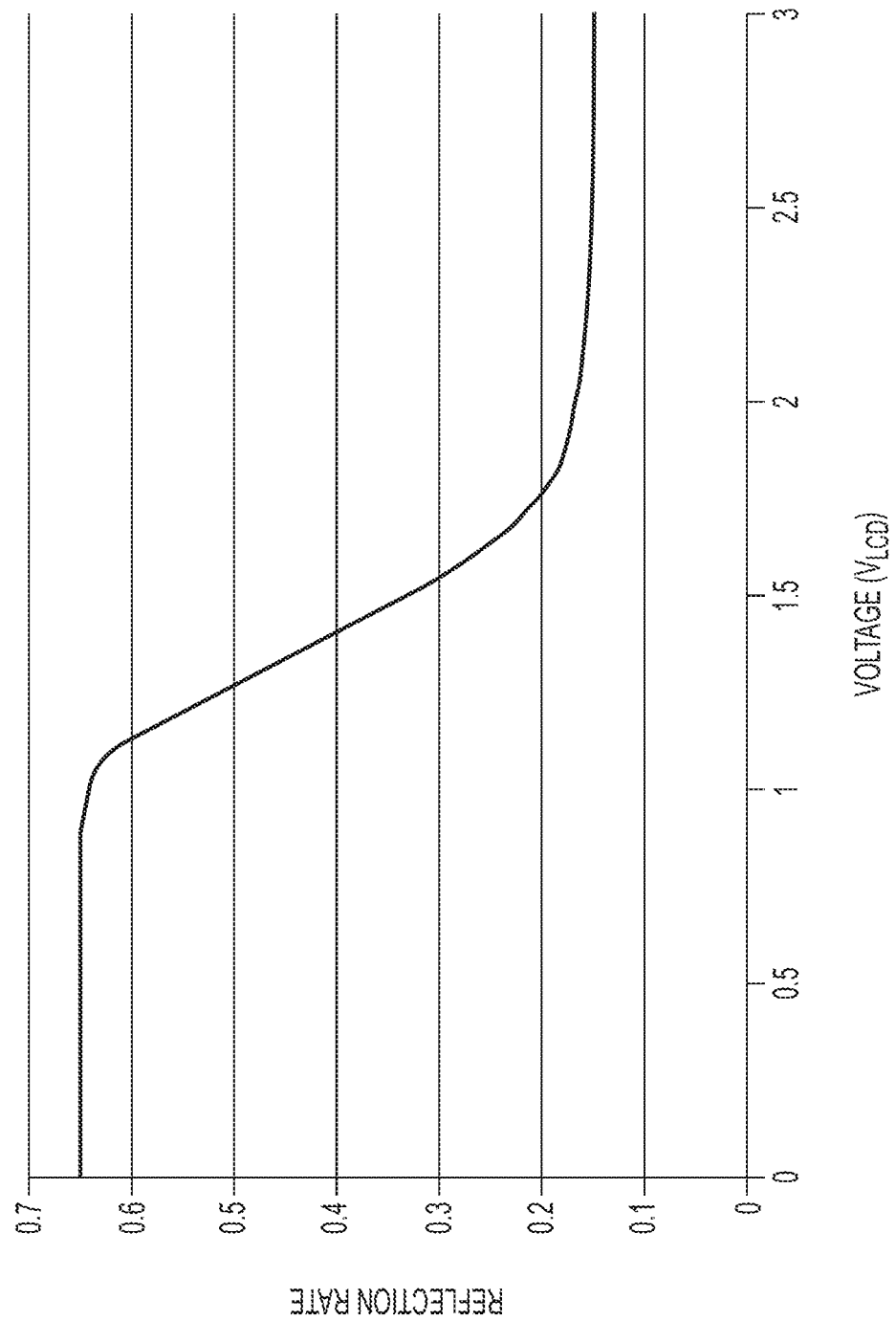
FIG. 11 is a graph of the Reflection Rate vs. Voltage for an active polarizer with a semi-transparent mirror.

As shown in FIG. 7, the first static reflective polarizer 54 is not removed from the sample segment 28 as was the case in previous transmissive example shown in the embodiments of FIGS. 5 and 6, which leads to a simpler implementation. The same Equation (10) applies to FIG. 7. However the implementation example as shown in FIG. 7 is the alternative active polarizer configuration as outlined in section 2.4 which has the semi-transparent mirror. Therefore assuming a perfect active absorptive polarizer 50, the semi-transparent mirror 56, 58 will raise the reflectance level as shown in FIG. 11. Note that the reflectance dynamic range is still 0.5 on "top" of a static reflectance controlled by the semi-transparent mirror. A semi-transparent mirror 56, 58 with 30% reflectance will provide a reflectance offset of 0.15 (15%) due to the operation of the first static reflective polarizer 54 in FIG. 7 which removes ½ of the light illuminating the semi-transparent mirror 56, 58. The transfer function shown in FIG. 11 would then be substituted into the transfer function block as shown in FIG. 16 for the PID control loop method.

It should be noted that although more accurate, the sample segment 28 as shown in FIG. 16 is not absolutely necessary. An alternative method is to sample LMax during power up and to use that value for the remainder of the operational cycle. If during the operational cycle LMax is commanded by the user or by the auto-dimming system, then of course that most recent LMax sample could be used by the PID loop for the remainder of the operational cycle.

The same reflective active feedback dimming technique may be utilized on active polarizer/rotator structure as shown in FIG. 8. Since there are two elements to control, one method is to sequentially sample the elements separately and control the elements via two feedback control loops such as in FIG. 16. This control method is described in detail below.

It should be noted that although more accurate, the sample segments 28 as shown in FIG. 8 is not absolutely necessary. An alternative method is to sample $L_{RotatorMax}$ and $L_{PolarizerMax}$ during power up and to use that values for the remainder of the operational cycle. If during the operational cycle $L_{RotatorMax}$ or $L_{PolarizerMax}$ is commanded by the user or by the auto-dimming system, then of course that most recent sample could be used by the PID loop for the remainder of the operational cycle.

Figure 17A:
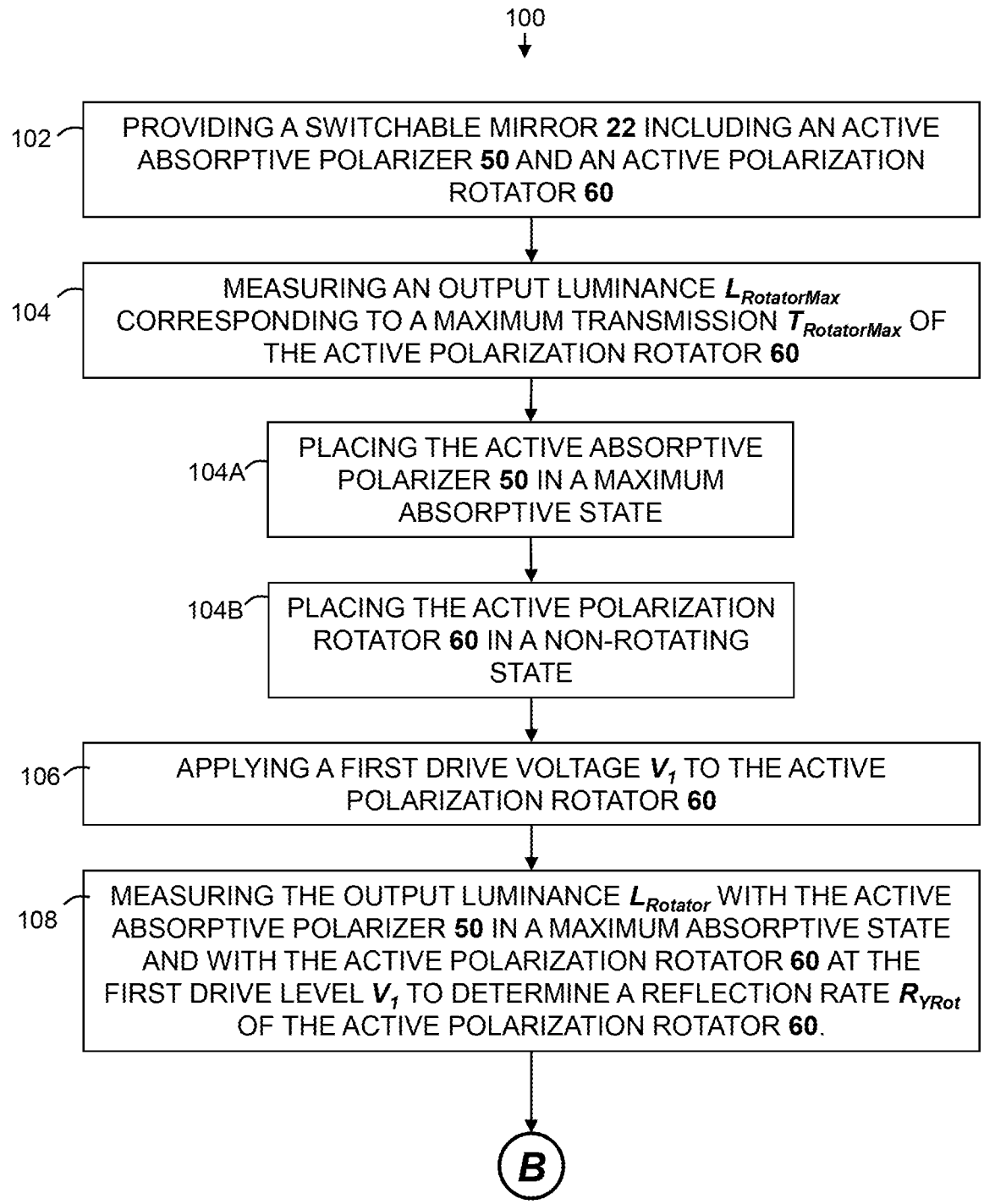
FIG. 17A is a flow chart of steps in an example method of controlling a bi-modal dimming mirror in accordance with the present disclosure.
Figure 17B:
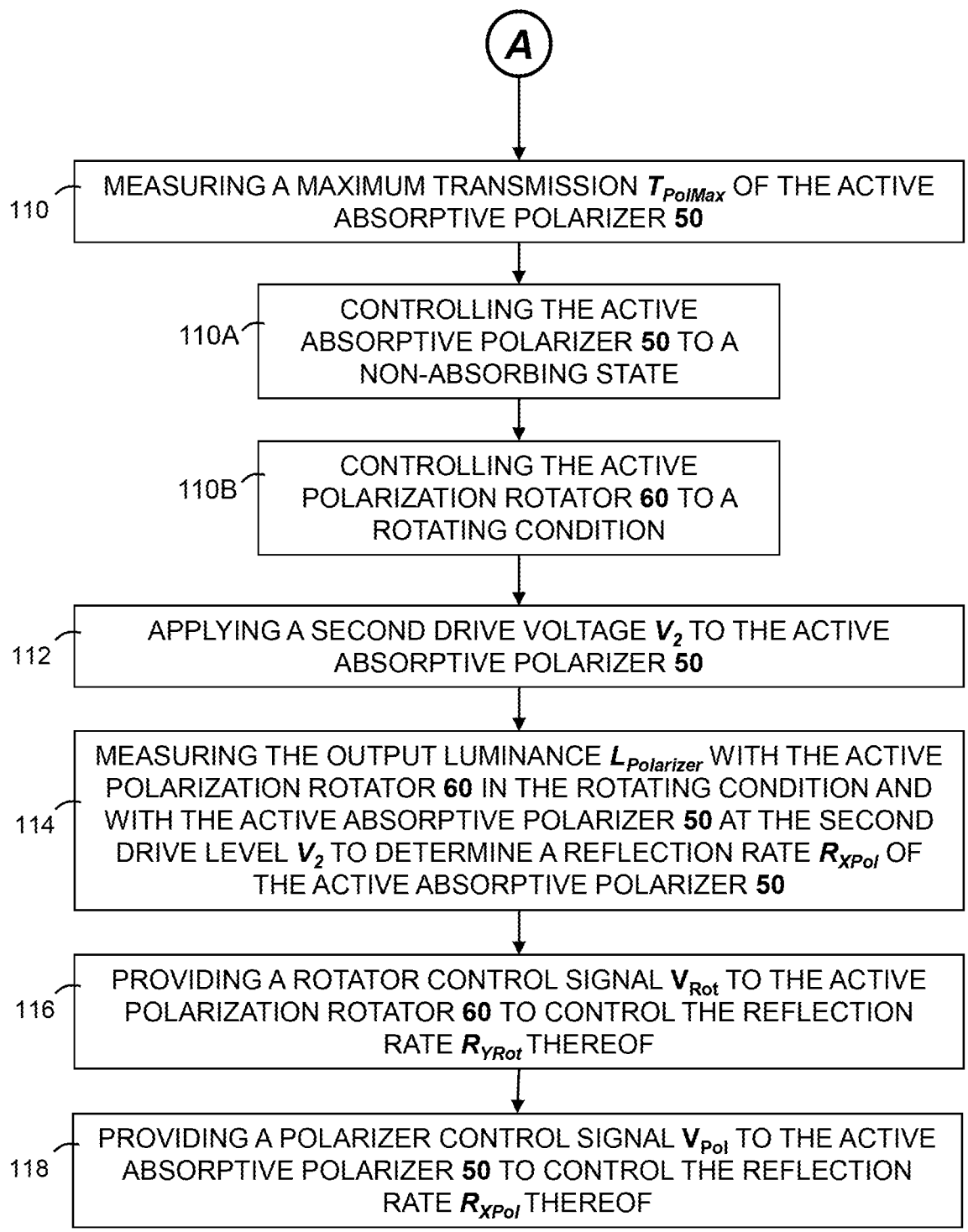
FIG. 17B is a continuation of the flow chart of FIG. 17A.

As illustrated in the flow chart of FIGS. 17A and 17B, an example method 100 of controlling a bi-modal dimming mirror 10. The method 100 provides for transmissive feedback dimming, in which the transmissivity of a switchable mirror 22 is measured and controlled. The reflection rate of the bi-modal dimming mirror 10 may be inferred based on a known relationship between transmission and reflection rates. In other words, the method 100 provides for calibrating the transmissivity of the switchable mirror 22. The method 100 is best shown with reference to the embodiment of FIG. 6. The method 100 includes the step of 102 providing a switchable mirror 22 including an active absorptive polarizer 50 and an active polarization rotator 60.

The method 100 can also include 104 measuring an output luminance $L_{RotatorMax}$ corresponding to a maximum transmission $T_{RotatorMax}$ of the active polarization rotator 60. Step 104 includes the substeps of 104A placing the active absorptive polarizer 50 in a maximum absorptive state; and 104B placing the active polarization rotator 60 in a non-rotating state. The active absorptive polarizer 50 of the presently disclosed embodiments are in the maximum absorptive state by being electrically energized by application of a voltage thereacross to absorb x-polarized light. The active polarization rotator 60 of the present disclosure is in the non-rotating state, passing light therethrough without altering the polarization, when electrically energized by application of a voltage thereacross.

The method 100 can also include 106 applying a first drive voltage $V_1$ to the active polarization rotator 60. The first drive voltage $V_1$, which may also be called a first drive level, may be a pulse-width modulation (PWM) signal. The first drive voltage $V_1$ causes the active polarization rotator 60 to be in a partially-rotating condition spanning from non-rotating to fully rotating, and may have a predetermined value. The first drive voltage $V_1$ may be generated as the output of a rotator Proportional-Integral-Derivative (PID) control loop, which may take the form of a velocity form PID loop that utilizes only the integration function. Examples of such velocity form PID control loops are illustrated in the diagrams of FIGS. 13-14.

The method 100 can also include 108 measuring the output luminance $L_{Rotator}$ with the active absorptive polarizer 50 in a maximum absorptive state and with the active polarization rotator 60 at the first drive voltage $V_1$ to determine a reflection rate $R_{YRot}$ of the active polarization rotator 60. The light sensor 34 measures the intensity of light passing through the sample segment 28 in the example embodiments to determine the output luminance $L_{Rotator}$.

The reflection rate $R_{YRot}$ of the active polarization rotator 60 may be determined by the following equation: $R_{YRot}=K_{Rotator}(L_{RotatorMax}-L_{Rotator})$, where $K_{Rotator}$ is a proportionality constant, $L_{RotatorMax}$ is the output luminance corresponding to a maximum transmission $T_{RotatorMax}$ of the active polarization rotator 60, and $L_{Rotator}$ is the output luminance resulting from the active polarization rotator 60 driven with a given first drive voltage $V_1$.

The method 100 can also include 110 measuring a maximum transmission $T_{PolMax}$ of the active absorptive polarizer 50. Step 110 can include substep 110A controlling the active absorptive polarizer 50 to a non-absorbing state. In the disclosed embodiments, the active absorptive polarizer 50 is de-energized in the non-absorbing state. Step 110 can include substep 110B controlling the active polarization rotator 60 to a rotating condition. In the disclosed embodiments, and as illustrated in FIG. 6, the active polarization rotator 60 is de-energized in the rotating condition, which provides for y-polarized light transmitted from a light source 30 and through a static reflective polarizer 62 to be rotated into the x orientation.

The method 100 can also include 112 applying a second drive voltage $V_2$ to the active absorptive polarizer 50. The second drive voltage $V_2$, which may also be called a second drive level, may be a pulse-width modulation (PWM) signal. The second drive voltage $V_2$ causes active absorptive polarizer 50 to be in a partially-absorbing condition spanning from non-absorbing to fully absorbing for the x polarized light, and may have a predetermined value. The second drive voltage $V_2$ may be generated as the output of an active polarizer PID control loop, which may take the form of a velocity form PID loop that utilizes only the integration function. Examples of such velocity form PID control loops are illustrated in the diagrams of FIGS. 13-14.

The method 100 can also include 114 measuring the output luminance $L_{Polarizer}$ with the active polarization rotator 60 in the rotating condition and with the active absorptive polarizer 50 at the second drive voltage $V_2$ to determine a reflection rate $R_{XPol}$ of the active absorptive polarizer 50. The light sensor 34 measures the intensity of light passing through the sample segment 28 in the example embodiments to determine the output luminance $L_{Polarizer}$.

The reflection rate $R_{XPol}$ of the active absorptive polarizer 50 may be determined by the following equation: $R_{XPol} = K_{Polarizer}(L_{PolarizerMax} - L_{Polarizer})$ where $K_{Polarizer}$ is a proportionality constant, $L_{PolarizerMax}$ is the output luminance corresponding to the maximum transmission $T_{PolMax}$ of the active absorptive polarizer 50, and $L_{Rotator}$ is the output luminance resulting from the active absorptive polarizer 50 driven with a given second drive voltage $V_2$.

The method 100 can also include 116 providing a rotator control signal $V_{Rot}$ to the active polarization rotator 60 to control the reflection rate $R_{YRot}$ thereof. In the example embodiments provided, the rotator control signal $V_{Rot}$ is an AC voltage applied to the active polarization rotator 60.

The method 100 can also include 118 providing a polarizer control signal $V_{Pol}$ to the active absorptive polarizer 50 to control the reflection rate $R_{XPol}$ thereof. In the example embodiments provided, the polarizer control signal $V_{Pol}$ is an AC voltage applied to the active absorptive polarizer 50.

Figure 12:
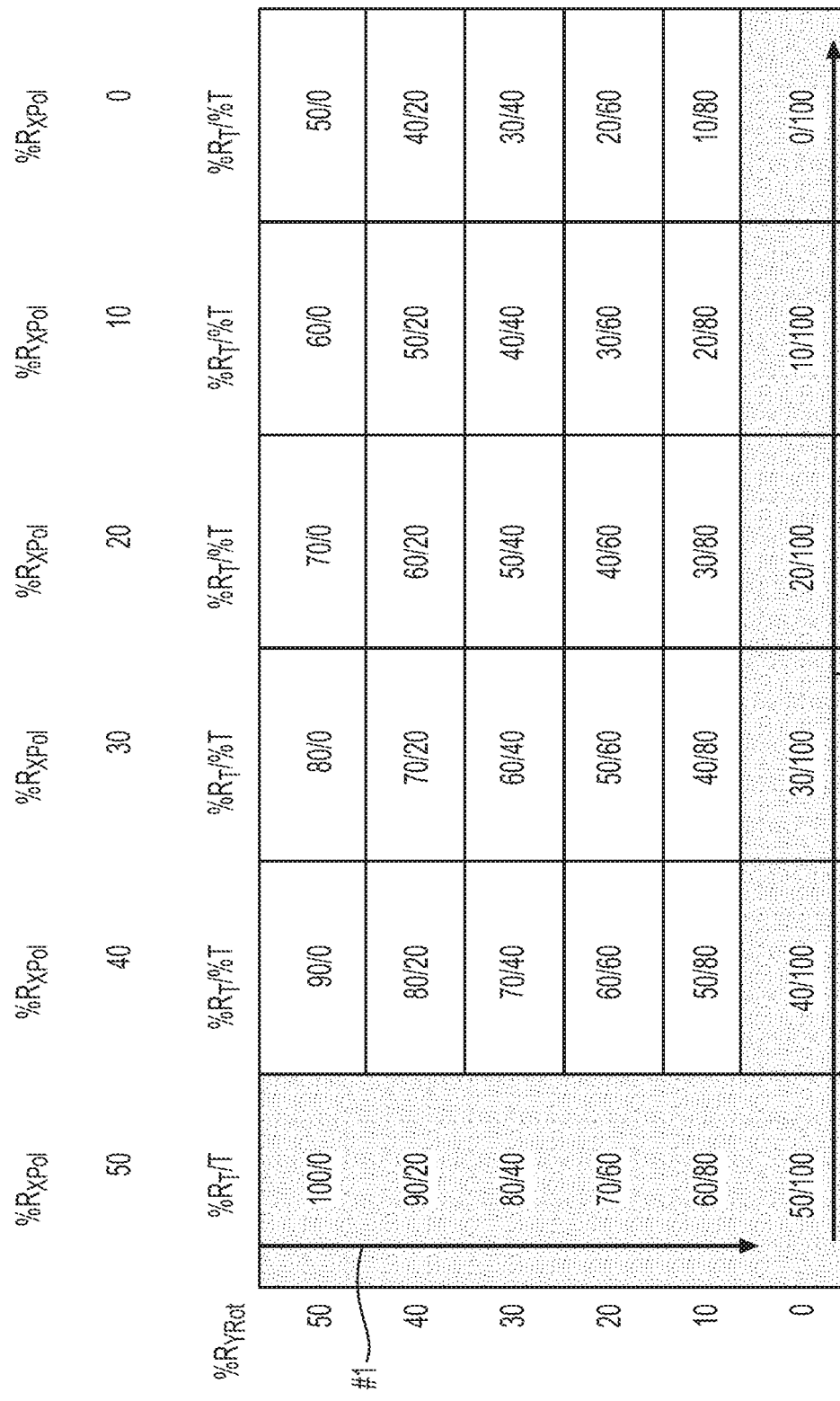
FIG. 12 is a table of reflection rates for different amounts of active polarization control and different amounts of active rotation control.

The rotator and polarizer control signals $V_{Rot}$, $V_{Pol}$ are preferably generated by separate PID control loops. As illustrated by the arrows labeled #1 and #2 on the table of FIG. 12, the active rotator control is preferably performed first, with the active polarizer control performed afterward.

Figure 18A:
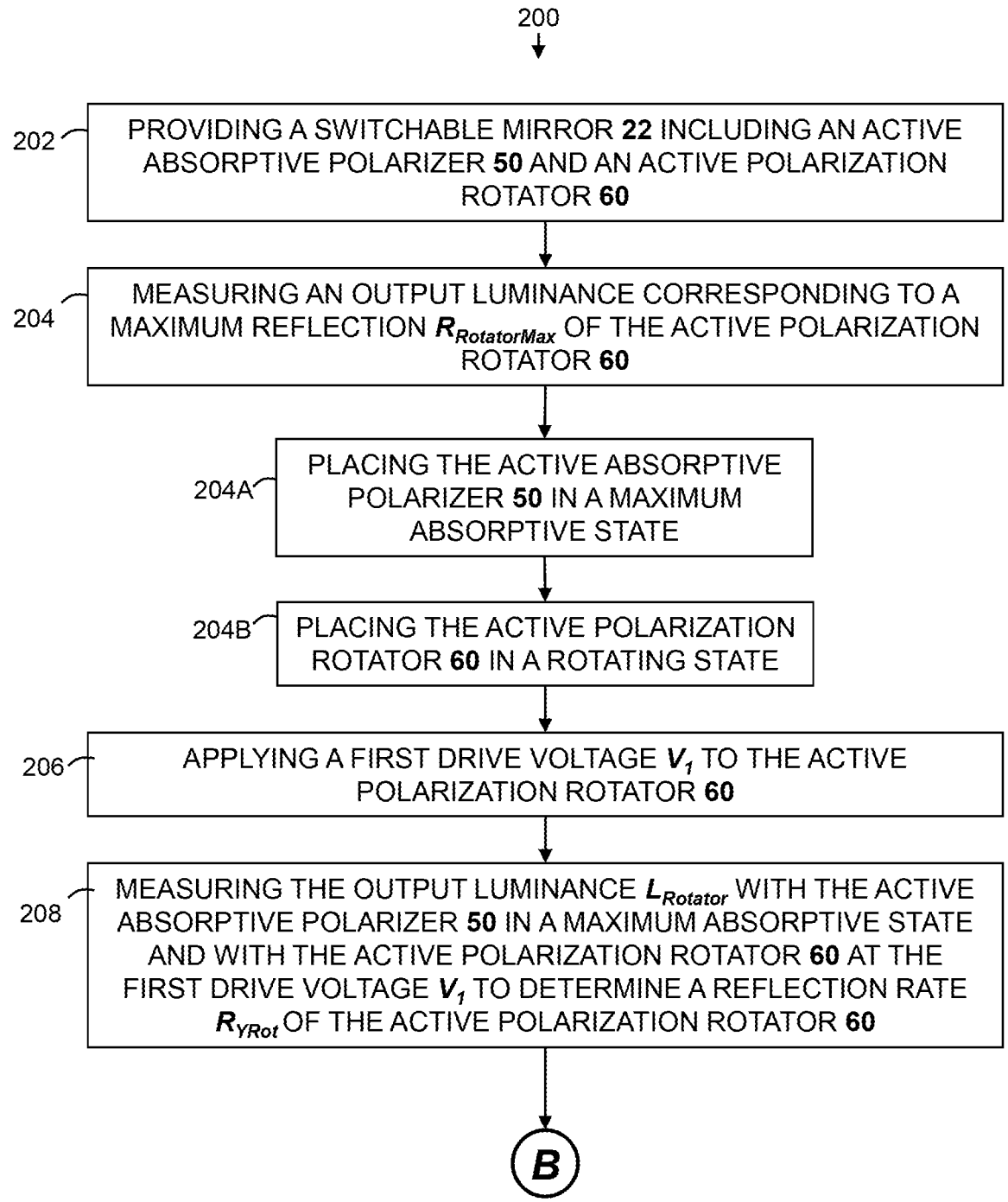
FIG. 18A is a flow chart of steps in another example method of controlling a bi-modal dimming mirror in accordance with the present disclosure.
Figure 18B:
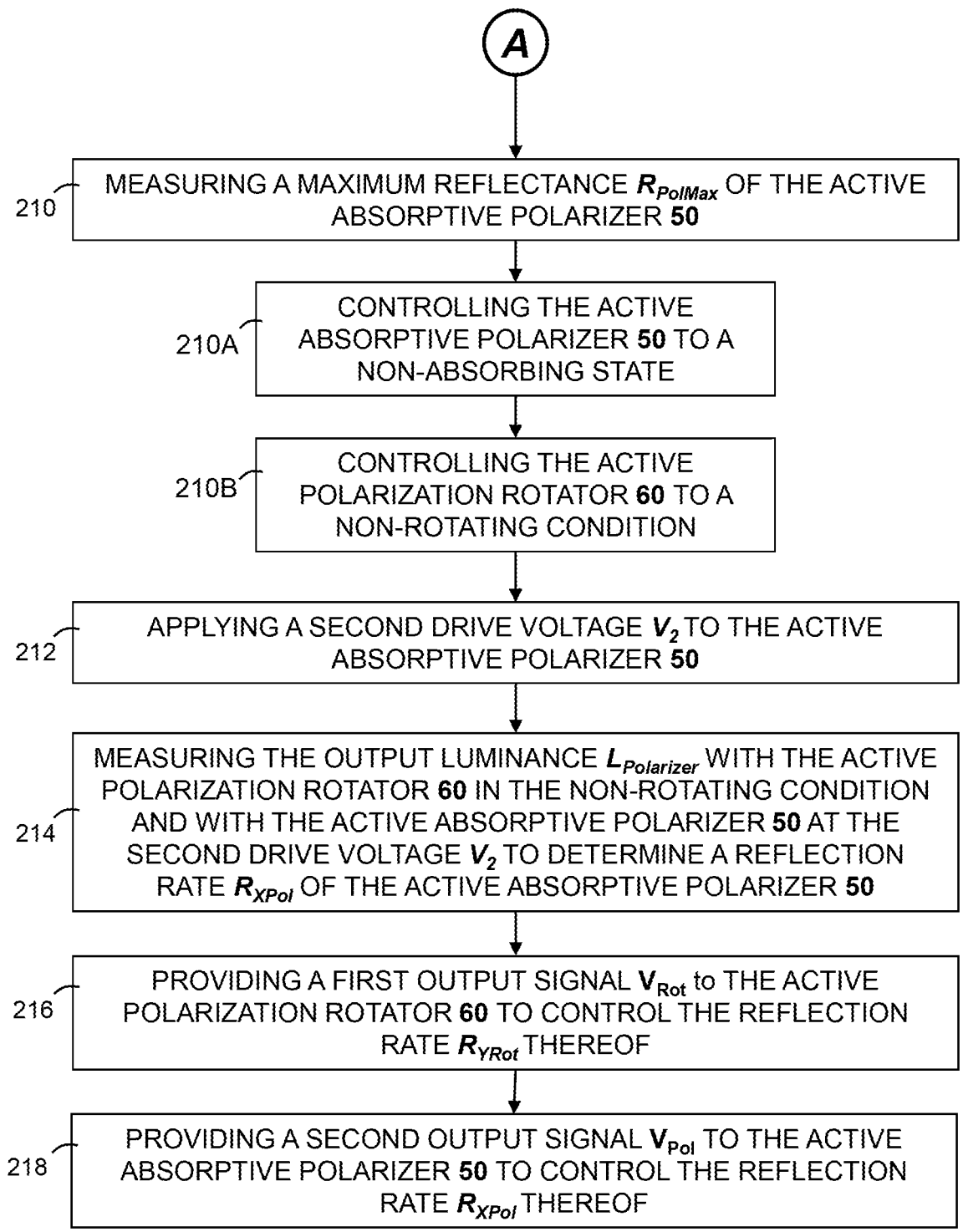
FIG. 18B is a continuation of the flow chart of FIG. 18A.

As illustrated in the flow charts of FIGS. 18A and 18B, another example method 200 of controlling a bi-modal dimming mirror 10 is also provided. The method 200 is best shown with reference to the embodiment of FIG. 8. The method 200 provides for reflective feedback dimming, in which the reflection rate of a switchable mirror 22 is measured and controlled. In other words, the method 200 provides for calibrating the reflectivity of the switchable mirror 22. The method 200 includes the step of 202 providing a switchable mirror 22 including an active absorptive polarizer 50 and an active polarization rotator 60.

The method 200 can also include 204 measuring an output luminance corresponding to a maximum reflection $R_{RotatorMax}$ of the active polarization rotator 60. Step 204 includes the sub steps of 204A placing the active absorptive polarizer 50 in a maximum absorptive state; and 204B placing the active polarization rotator 60 in a rotating state. The active absorptive polarizer 50 of the presently disclosed embodiments are in the maximum absorptive state by being electrically energized by application of a voltage thereacross to absorb x-polarized light. The active polarization rotator 60 of the present disclosure is in the rotating state to rotate the polarization of light passing therethrough when electrically de-energized.

The method 200 can also include 206 applying a first drive voltage $V_1$ to the active polarization rotator 60. The first drive voltage $V_1$, which may also be called a first drive level, may be a pulse-width modulation (PWM) signal. The first drive voltage $V_1$ causes the active polarization rotator 60 to be in a partially-rotating condition spanning from non-rotating to fully rotating, and may have a predetermined value. The first drive voltage $V_1$ may be generated as the output of a rotator PID control loop, which may take the form of a velocity form PID loop that utilizes only the integration function. Examples of such velocity form PID control loops are illustrated in the diagrams of FIGS. 15-16.

The method 200 can also include 208 measuring the output luminance $L_{Rotator}$ with the active absorptive polarizer 50 in a maximum absorptive state and with the active polarization rotator 60 at the first drive voltage $V_1$ to determine a reflection rate $R_{YRot}$ of the active polarization rotator 60. The light sensor 34 measures the intensity of light passing through the sample segment 28 in the example embodiments to determine the output luminance $L_{Rotator}$.

The reflection rate $R_{YRot}$ of the active polarization rotator 60 may be determined by the following equation:

$$R_{YRot} = R_{RotatorMax} \frac{L_{Rotator}}{L_{RotatorMax}},$$

where $L_{RotatorMax}$ is the output luminance corresponding to the maximum reflectance $R_{RotatorMax}$ of the active polarization rotator 60, and $L_{Rotator}$ is the output luminance resulting from the active polarization rotator 60 driven with a given first drive voltage $V_1$.

The method 200 can also include 210 measuring a maximum reflectance $R_{PolMax}$ of the active absorptive polarizer 50. Step 210 can include substep 210A controlling the active absorptive polarizer 50 to a non-absorbing state. In the disclosed embodiments, the active absorptive polarizer 50 is de-energized in the non-absorbing state. Step 210 can also include substep 210B controlling the active polarization rotator 60 to a non-rotating condition. In the disclosed embodiments, and as illustrated in FIG. 8, the active polarization rotator 60 is energized in the non-rotating condition, which provides for y-polarized light transmitted from a light source 30 and through a static reflective polarizer 62 to pass through without change in polarization.

The method 200 can also include 212 applying a second drive voltage $V_2$ to the active absorptive polarizer 50. The second drive voltage $V_2$, which may also be called a second drive level, may be a pulse-width modulation (PWM) signal. The second drive voltage $V_2$ causes active absorptive polarizer 50 to be in a partially-absorbing condition spanning from non-absorbing to fully absorbing for the x polarized light, and may have a predetermined value. The second drive voltage $V_2$ may be generated as the output of an active polarizer PID control loop 66, which may take the form of a velocity form PID loop that utilizes only the integration function. Examples of such velocity form PID control loops are illustrated in the diagrams of FIGS. 15-16.

The method 200 can also include 214 measuring the output luminance $L_{Polarizer}$ with the active polarization rotator 60 in the non-rotating condition and with the active absorptive polarizer 50 at the second drive voltage $V_2$ to determine a reflection rate $R_{XPol}$ of the active absorptive polarizer 50. The light sensor 34 measures the intensity of light passing through the sample segment 28 in the example embodiments to determine the output luminance $L_{Polarizer}$.

The reflection rate $R_{XPol}$ of the active absorptive polarizer 50 may be determined by the following equation:

$$R_{XPol} = R_{PolarizerMax} \frac{L_{Polarizer}}{L_{PolarizerMax}},$$

where $L_{PolarizerMax}$ is the output luminance corresponding to the maximum reflectance $R_{PolMax}$ of the active absorptive polarizer 50, and $L_{Polarizer}$ is the output luminance resulting from the active absorptive polarizer 50 driven with the given second drive voltage $V_2$.

The method 200 can also include 216 providing a first output signal $V_{Rot}$ to the active polarization rotator 60 to control the reflection rate $R_{YRot}$ thereof. In the example embodiments provided, the rotator control signal $V_{Rot}$ is an AC voltage applied to the active polarization rotator 60.

The method 200 can also include 218 providing a second output signal $V_{Pol}$ to the active absorptive polarizer 50 to control the reflection rate $R_{XPol}$ thereof. In the example embodiments provided, the polarizer control signal $V_{Pol}$ is an AC voltage applied to the active absorptive polarizer 50.

The rotator and polarizer output signals $V_{Rot}$, $V_{Pol}$ are preferably generated by separate PID control loops. As illustrated by the arrows labeled #1 and #2 on the table of FIG. 12, the active rotator control is preferably performed first, with the active polarizer control performed afterward.

The system, methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or alternatively, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices as well as heterogeneous combinations of processors processor architectures, or combinations of different hardware and software, or any other machine capable of executing program instructions.

Thus, in one aspect, each method described above and combinations thereof may be embodied in computer executable code that, when executing on one or more computing devices performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

Obviously, many modifications and variations of the present invention are possible in light of the above teachings and may be practiced otherwise than as specifically described while within the scope of the appended claims.

What is claimed is:

1. A bi-modal dimming mirror comprising:
   a display panel for generating an image;
   a switchable mirror overlying the display panel and configured to vary in transmissivity in response to a dimming control signal;
   the switchable mirror including a visible segment overlying a portion of the display panel for presenting a graphical image to a viewer;
   the switchable mirror including a sample segment independent of the visible segment and configured to calibrate the transmissivity or the reflectivity of the switchable mirror;
   a light source for projecting a light beam through the sample segment of the switchable mirror; and
   a light sensor overlying the sample segment opposite the display panel for measuring a reflection rate of the sample segment by measuring an intensity of the light beam.

2. The bi-modal dimming mirror as set forth in claim 1 wherein the light source is disposed on a side of the switchable mirror opposite a viewing surface.

3. The bi-modal dimming mirror as set forth in claim 2 wherein the light source is integral with the display panel.

4. The bi-modal dimming mirror as set forth in claim 2 wherein the light source is independent of the display panel.

5. The bi-modal dimming mirror as set forth in claim 1 wherein the light source is disposed on a viewing surface of the switchable mirror.

6. The bi-modal dimming mirror as set forth in claim 1 wherein the switchable mirror comprises a liquid crystal cell for changing polarization of light passing therethrough in response to application of an LCD voltage and positioned between a linear absorptive polarizer and a static reflective polarizer.

7. The bi-modal dimming mirror as set forth in claim 1 wherein the visible segment of the switchable mirror includes an active absorptive polarizer that varies in absorption of light polarized in an x-direction in response to a polarizer control signal; and
   wherein the visible segment of the switchable mirror includes a first static reflective polarizer configured to reflect the light polarized in the x-direction and to transmit light polarized in a y-direction orthogonal to the x-direction; and
   wherein the sample segment does not include a reflective polarizer.

8. The bi-modal dimming mirror as set forth in claim 7 wherein the first static reflective polarizer is one of a Reflective Polarizer Mirror (RPM) film or a wire grid polarizer.

9. The bi-modal dimming mirror as set forth in claim 7 wherein the visible segment of the switchable mirror includes a first semi-transparent mirror.

10. The bi-modal dimming mirror as set forth in claim 9 wherein the sample segment of the switchable mirror includes a second semi-transparent mirror separate from the first semitransparent mirror.

11. The bi-modal dimming mirror as set forth in claim 1 further including:
an active polarization rotator configured to selectively rotate the polarization of light passing therethrough in response to a rotator control signal.

12. The bi-modal dimming mirror as set forth in claim 7 further including:
an active polarization rotator adjacent the first static reflective polarizer and opposite a viewing surface and configured to selectively rotate the polarization of light passing therethrough in response to a rotator control signal.

13. The bi-modal dimming mirror as set forth in claim 12 further including:
a second static reflective polarizer adjacent the active polarization rotator and opposite the first static reflective polarizer.

14. A method of controlling a bi-modal dimming mirror comprising:
measuring an output luminance corresponding to a maximum transmission of an active polarization rotator;
applying a first drive voltage to the active polarization rotator;
measuring the output luminance with an active absorptive polarizer in a maximum absorptive state and with the active polarization rotator at the first drive voltage to determine a reflection rate of the active polarization rotator;
measuring a maximum transmission of the active absorptive polarizer;
applying a second drive voltage to the active absorptive polarizer; and
measuring the output luminance with the active polarization rotator in the rotating condition and with the active absorptive polarizer at the second drive voltage to determine a reflection rate of the active absorptive polarizer.

15. The method of controlling a bi-modal dimming mirror as set forth in claim 14, further comprising:
providing a first output signal to the active polarization rotator to control the reflection rate thereof; and
providing a second output signal to the active absorptive polarizer to control the reflection rate thereof.

16. The method of controlling a bi-modal dimming mirror as set forth in claim 14, wherein at least one of the first drive voltage or the second drive voltage is a pulse-width modulation (PWM) signal.

17. The method of controlling a bi-modal dimming mirror as set forth in claim 14, wherein at least one of the first drive voltage or the second drive voltage is generated as the output of a Proportional-Integral-Derivative (PID) control loop.

18. The method of controlling a bi-modal dimming mirror as set forth in claim 17, wherein the Proportional-Integral-Derivative (PID) control loop is a velocity form PID loop utilizing only an integration function.

19. A method of controlling a bi-modal dimming mirror comprising:
measuring an output luminance corresponding to a maximum reflection of an active polarization rotator;
applying a first drive voltage to the active polarization rotator;
measuring the output luminance with an active absorptive polarizer in a maximum absorbing state, and with the active polarization rotator at the first drive voltage to determine a reflection rate of the active polarization rotator;
measuring a maximum reflectance of the active absorptive polarizer by controlling the active absorptive polarizer to a minimal absorbing state and controlling the active polarization rotator to a non-rotating condition;
applying a second drive voltage to the active absorptive polarizer; and
measuring the output luminance with the active polarization rotator in the non-rotating condition and with the active absorptive polarizer at the second drive voltage to determine a reflection rate of the active absorptive polarizer.

20. The method of controlling a bi-modal dimming mirror as set forth in claim 19, further comprising:
providing a first output signal to the active polarization rotator to control the reflection rate thereof; and
providing a second output signal to the active absorptive polarizer to control the reflection rate thereof.

\* \* \* \* \*